(12) United States Patent
Baron

(10) Patent No.: US 6,459,388 B1
(45) Date of Patent: Oct. 1, 2002

(54) ELECTRONIC TOUR GUIDE AND PHOTO LOCATION FINDER

(75) Inventor: John M. Baron, Longmont, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/765,187

(22) Filed: Jan. 18, 2001

(51) Int. Cl.[7] .............................................. G08G 1/123
(52) U.S. Cl. ........................ 340/996; 340/995; 345/435
(58) Field of Search .......................... 340/573.1, 573.4, 340/539, 10.41, 10.51, 10.6, 995, 996; 701/201, 208, 213; 342/456, 457; 345/435; 348/153, 157, 159, 589; 707/104.1, 102; 705/7, 26

(56) References Cited

U.S. PATENT DOCUMENTS

| | | | |
|---|---|---|---|
| D365,032 S | | 12/1995 | Laverick et al. ............. D10/78 |
| 5,760,742 A | * | 6/1998 | Branch et al. ............... 342/457 |
| 5,913,078 A | | 6/1999 | Kimura et al. ................ 396/50 |
| 5,915,020 A | * | 6/1999 | Tilford et al. ............... 455/3.02 |
| 6,064,398 A | * | 5/2000 | Ellenby et al. ............. 345/435 |
| 6,202,023 B1 | * | 3/2001 | Hancock et al. ............ 701/201 |
| 6,263,279 B1 | * | 7/2001 | Bianco et al. ............... 701/213 |
| 6,297,853 B1 | * | 10/2001 | Sharir et al. ................. 348/589 |

* cited by examiner

*Primary Examiner*—Van Trieu

(57) ABSTRACT

A location database system provides information about nearby sites to a user. The system includes a processor configured to identify the present location of the system using the Global Positioning System. The processor is also associated with a clock providing realtime information. The clock may be the internal clock of a microprocessor serving as the processor of the system. The processor may also communicate with a remote database of sites using a wireless connection. The database includes relevant information about the sites which may be of interest to a user of the system, such as locational information, imaging information and images, and/or tour-guide type information. A display provides a visual display of the relevant information to the user, and the system may provide setting information for the camera and also may provide travel directions to a particular site, based on a selected view as seen on a display.

20 Claims, 4 Drawing Sheets

ELECTRONIC TOUR GUIDE AND PHOTO LOCATION FINDER

TECHNICAL FIELD

The invention relates to data retrieval system with integrated position locating configured to provide geographically relevant information to a user based on current location.

BACKGROUND

Numerous tools have been developed to aid travelers in their travels by those who have gone before them. For example, early man created maps to aid navigation across geographic areas and the high seas. However, the art of cartography is of limited use to many travelers. Certain maps, such as aquatic maps, require specialized training and tools to be of use to the common traveler.

Furthermore, even easy to read street maps suffer from many drawbacks. Although street maps are helpful in guiding a traveler from point A to point B, the portable size of these written maps necessarily results in them providing very limited information. Typically, street maps only provide a user with the locations, name, and type of roads, railroads and waterways traversing the mapped area (in conjunction with the names of the municipalities encompassing the area). In some cases, street maps of a relatively small geographic area may provide the physical location of particular buildings and landmarks. However, presumably due to the portable size of maps and the lack of space for the written word, these maps typically do not provide information on the history or significance of a particular landmark; and do not provide any other information about, or pictures of, the area that would be of value to the traveler. Often a personal tour guide is the only source of this type of valuable information.

Written tour books for travelers have been developed in an attempt to fill the void of information left by map page alone. However, tour books suffer from similar drawbacks in many instances. For example, tour books are designed to be portable and thus are also somewhat limited in the amount of information they carry and are soon outdated. Furthermore, the relative volume of information makes them much more difficult to navigate through than a map. Oftentimes, the way the information is organized requires a traveler to do a lot of reading and pre-planning before a journey. If the traveler should wind up in an area different than the one pre-planned, developing an alternative itinerary often proves difficult because information about the area may be difficult to locate or easily missed depending on the particular tour book, its organization, and the user's familiarity with the book. A personal tour guide having already mastered the area would be of particular use in developing an alternative agenda.

One area where the art has attempted to provide the information of a tour guide (without the need for waiting for a designated tour time) is in the area of audiotaped tours. In certain museums and other venues, a visitor may rent an audiotaped tour and headset for the event. After starting the tape, the visitor is guided through the event step by step and provided with tour-guide type information as if a live tour guide was leading the visitor through the tour. However, like live tours, recorded tours make it difficult, if not impossible, for a visitor to customize the tour. A visitor is basically precluded from varying the order of the tour, adding to the tour, or skipping parts of the tour by the inherent difficulty in finding the appropriate place on the tape for a particular part of the tour. Some systems have the prerecorded information broadcast on a room by room basis which allows users to wonder around and not follow a prescribed path. Even with these systems, the user only receives what the preparer thought to tell him/her. A personal tour guide allowing a visitor to add, subtract, otherwise modify, or inquire about items on the tour would overcome many of the drawbacks of both recorded and professionally-guided tours.

One area where the art has made virtually no advances is in aiding a traveler in identifying areas and conditions of visual and picturesque prominence for viewing or photo opportunities. Along the highways and bi-ways of America one sees "Scenic Overlook" or other signage indicating a site of visual interest. Sometimes similar signage or information is found in city buildings or along mountain trails to direct a visitor to a viewing area. However, these signs fail to give the interested traveler any information about the optimal viewing conditions, such as the best time of day, time of year, and weather conditions, for experiencing the view or capturing a desired photograph. Oftentimes, this valued information is only known to natives, residents, or previous travelers, and therefore inaccessible to the ordinary traveler. Furthermore, signage and associated information is expensive and cumbersome to install (and remove) in many locales. Even where signage is feasible; the providing, updating, adding or subtracting of related information may not be feasible.

Oftentimes, the provision of signage to direct an interested traveler to a place of visual or picturesque significance is not feasible. This is particularly true in the great outdoors where not only the expense of displaying signs is prohibitive, but also the damage to the aesthetic beauty and pristine conditions of the area counsel against unnecessary signage. The absence of signage is unfortunate for the interested traveler because most trail maps (and city maps) fail to adequately identify areas of optimal picturesque quality that are out of the traveler's immediate sight, but within the general vicinity. Furthermore, even when indicated as a scenic point of interest on a map, the map typically fails to include sample photographs and viewing conditions to let the traveler decide if a trek to the designated area is worthwhile. A personal tour guide having personal knowledge of an area may be the only source for discovering that not only is there a site of visual interest nearby, but also that a visit to the site under present conditions is worthwhile.

The use of a map, or any navigational system, requires the user to know their location relative to a known landmark or their exact location on the Earth. One recent advance in the art which aids individuals in identifying and tracking their exact location on the Earth is the global positioning system (GPS).

Aside from positional data, there is limited information in GPS to date. GPS has been used in connection with a moving map display to aid auto travelers in navigating the highways and bi-ways of America. However, the moving map has little information other than information on the physical location of the roads being navigated. GPS has also been used to aid pilots in finding the closest airport in emergencies. However, the system provides little information other than the best route to take to reach the airport.

GPS has been used with cameras. U.S. Pat. No. 5,913,78 (Kimura et al.) discloses that a camera can be coupled with a GPS system for the purpose of providing locational information on a photograph to indicate where on the Earth the photo was taken.

The foregoing underscores some of the problems and limitations associated with travel aids and positioning systems.

SUMMARY OF THE INVENTION

The present invention is directed to a system and method which relates to a position locating system. More particularly, the present invention relates to a positioning system adapted to provide a user with location dependent and relevant information, allow a user to give information, and/or otherwise allow a user to interact with selected information about objects, features, events and/or other like information in the vicinity of the user.

The present invention overcomes many of the practical problems described above and offers new advantages as well. The present invention includes a positioning system adapted to allow a user to access, view, use, provide, or otherwise interact with, selected information about particular sites, items, features, conditions, and/or other phenomena in the vicinity of the geographic area in which the user operates.

Accordingly, it is an object of the present invention to provide a portable positioning system adapted to provide a user with information about nearby sites. It is a related object of the invention to provide a portable positioning system adapted to provide information about nearby sites which are identified to be of particular interest to the user.

It is another object of the invention to provide a positioning system adapted to accept and/or communicate user-inputted information about sites to a database for use by others accessing the system.

It is yet another object of the invention to provide a portable positioning system adapted to provide tour guide-type information for aiding a traveler. It is a further object of the invention to provide a positioning system adapted to aid a traveler, wherein the system is interfaced or integrated such that user-inputted information is accepted and used for developing or altering an itinerary or agenda.

Another object of the invention is to provide a positioning system adapted to provide a user with information for locating a photo-spot. As used herein "photo-spot" is intended to mean a spot from which to view, photograph, or otherwise capture a site of interest. It is a further object of the invention to provide a positioning system for finding a photo-spot, wherein the system provides the user with optimal viewing conditions. It is a related object of the invention to provide a photo-spot finding system that also provides the user with realtime weather and time information. According to yet another related object of the invention, the positioning system also provides the user with a visual image of the site of interest.

These and other objects may be realized by a portable location database system including a positioning processor configured to identify a present location of the system. A clock provides time information. A database stores information about, while a display is configured to provide, in response to the present location and the time clock information, a visual display of at least the nearest of said sites having realtime information satisfying a predetermined criteria.

Further objects of the present invention may be satisfied by providing the positioning systems described above, wherein the positioning system is interfaced with, integral with, or provided with an optical system capable of projecting an image of a subject onto a light sensitive media.

According to this aspect of the invention, the optical device is preferably a camera. In accordance with this aspect of the invention, a presently preferred embodiment comprises a camera having a positioning system built into the camera. Also according to this aspect of the invention, another preferred embodiment comprises a camera in communication with a positioning system and having a display panel for viewing site information and/or directions to a site.

Additional objects of the invention may be satisfied by providing the integrated optical devices described above, wherein the site information includes stored images of the sites capable of being viewed by a user of the device. Other objects of the invention may be realized by providing the aforementioned devices, wherein the site information includes imaging data comprising camera parameters for capturing the optimal image of the site with the camera.

It is another object of the invention to provide the integrated optical devices described herein, wherein the image generated by the device is associated or labeled with the location of the system and preferably including realtime information.

It is yet another object of the invention to provide a positioning system adapted to accept optical device images and/or associated location information and provide such information or images for access and use by other users of the positioning system.

In accordance with another object of the invention, there is disclosed methods of using the aforementioned systems and devices.

The above and other objects, aspects, features and advantages of the present invention will become apparent from the following enabling description and drawings. The following enabling disclosure is directed to one of ordinary skill in the art and presupposes that those aspects of the invention within the ability of the ordinarily skilled artisan are understood and appreciated. The aspects and features of the invention believed to be novel, and other elements and characteristics of the invention, are set forth with particularity in the appended claims.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

DETAILED DESCRIPTION

Generally, the present invention relates to a positioning system adapted to provide a user with information concerning nearby sites. More particularly, the present invention relates to a portable location database system (PLDS) for identifying nearby sites of interest to a user. The PLDS may be a stand alone apparatus, or alternatively, integral with another device, such as a camera.

Figure 1:
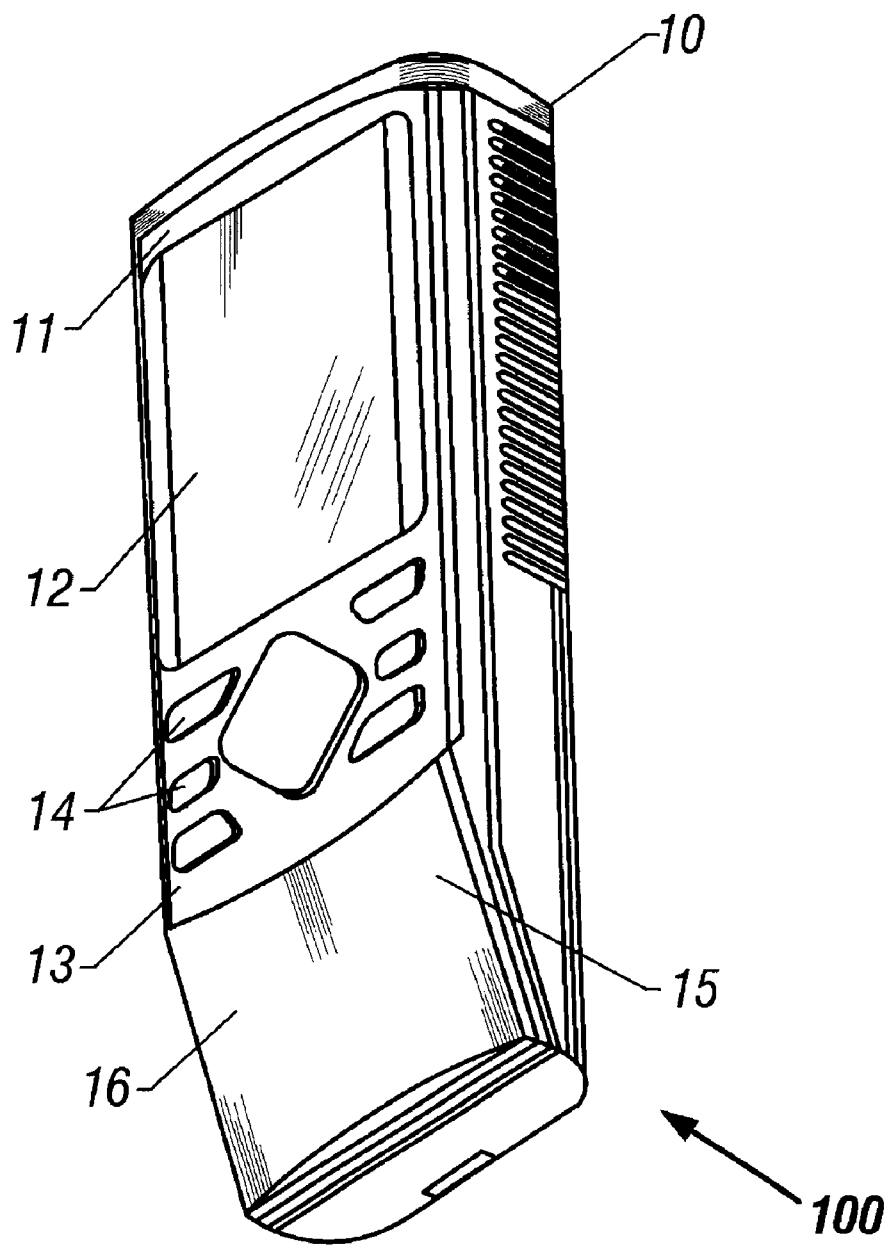
FIG. 1 is a perspective view of one embodiment of a stand-alone, portable location database system according to the invention.

FIG. 1 depicts a PLDS as it might be embodied as a stand-alone apparatus. As shown in FIG. 1, PLDS 100 comprises body housing 10 which houses internal electronics including a processor (not shown). Casing 10 preferably comprises high-impact plastic, or like material, which is sufficient to shield the internal electronics while also being sufficiently conductive to provide an RF window for an internally mounted antenna.

Housing 10 has a front panel 11 which contains, for example, display 12, and user interface area 13 having command keys 14, and area 16 for housing antenna 15. Presently preferred displays include LCD panels and the like. Alternative displays are also included within the scope of the invention as one of ordinary skill in the art would understand. The invention should not be viewed as limited to the type of display used.

Command keys 14, or interface buttons (which also can be soft keys on display 12), allow a user to scroll through, select, or otherwise choose and manipulate information presented on display 12. As will be appreciated by one of ordinary skill in the art, additional keys, buttons, or user interface controls may be provided to allow a user to enter, edit, or view information; or to allow a user to otherwise operate the system.

Antenna 15, which may be of any suitable configuration for receiving GPS satellite signals, is preferably housed within casing 10. The housing should be constructed of material(s) which will not adversely affect the reception of the antenna 15. Although an internally-housed antenna 15 is presently preferred to help shield the antenna 15 from damage or environmental hazards, antenna 15 may be external to housing 10.

Although not depicted on FIG. 1, PLDS 100 may be equipped with sound for audio output (and input) of information. The use of sound could be in addition to the visual display, or to the exclusion of the display.

Figure 2:
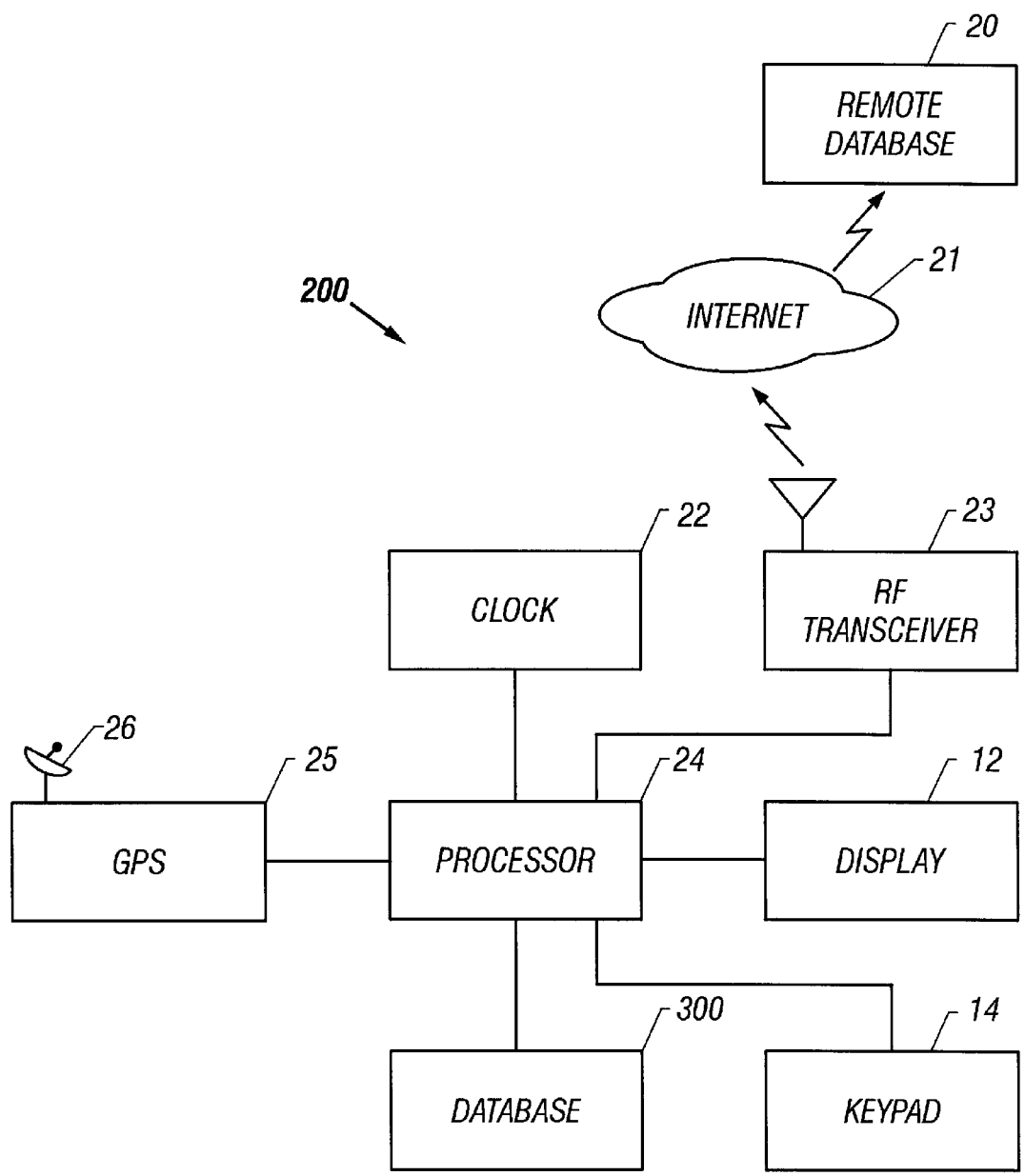
FIG. 2 is a block diagram depicting one embodiment of a portable location database system (PLDS) according to the invention.

FIG. 2 depicts block diagram 200 of a presently preferred PLDS according to the invention.

Processor 24 housed within housing 10 is preferably a microprocessor, such as a general purpose programmable microprocessor or an application specific integrated circuit (ASIC). Processor 24 is configured to identify the present location of PLDS 100. In a presently preferred embodiment, processor 24 accomplishes this task by inclusion of Global Positioning System (GPS) 25. Locational identity by inclusion of GPS 25 with a microprocessor is well within the ability of those of ordinary skill in the art.

Processor 24 is also advantageously provided time information by clock 22. This clock information may be realtime information, time of day information or information of a similar nature. As will be appreciated by one of ordinary skill in the art, clock 22 may be part of processor 24, or alternatively, may be synchronized or derived from the clock signal received from GPS 24.

In addition to positioning information, processor 24 preferably includes access to current and predicted weather conditions for an area associated with the system's present location. For example, processor 24 may have Internet access to the National Weather Service's forecast information (http://weather.noaa.gov/weather/ccus.html). Access is preferably by wireless communication link so the system may be operated at remote locations.

Processor 24 provides data to the display 12 for presentation to the user. As previously discussed, display 12 may be an LCD or like display. Alternative displays may also be used in the present invention. Preferably, display 12 will be capable of presenting not only textual and perhaps graphical data, but also picture or video data.

Processor 24 is also in communication with database 300. In a presently preferred embodiment, processor 24 includes a wireless interface, such as an RF transceiver 23, to a remote database 300, such as remote database 20 accessible over Internet 21. Alternatively, database 300 may be in the form of a diskette or other removable memory media that is inserted into PLDS 100.

Figure 3:
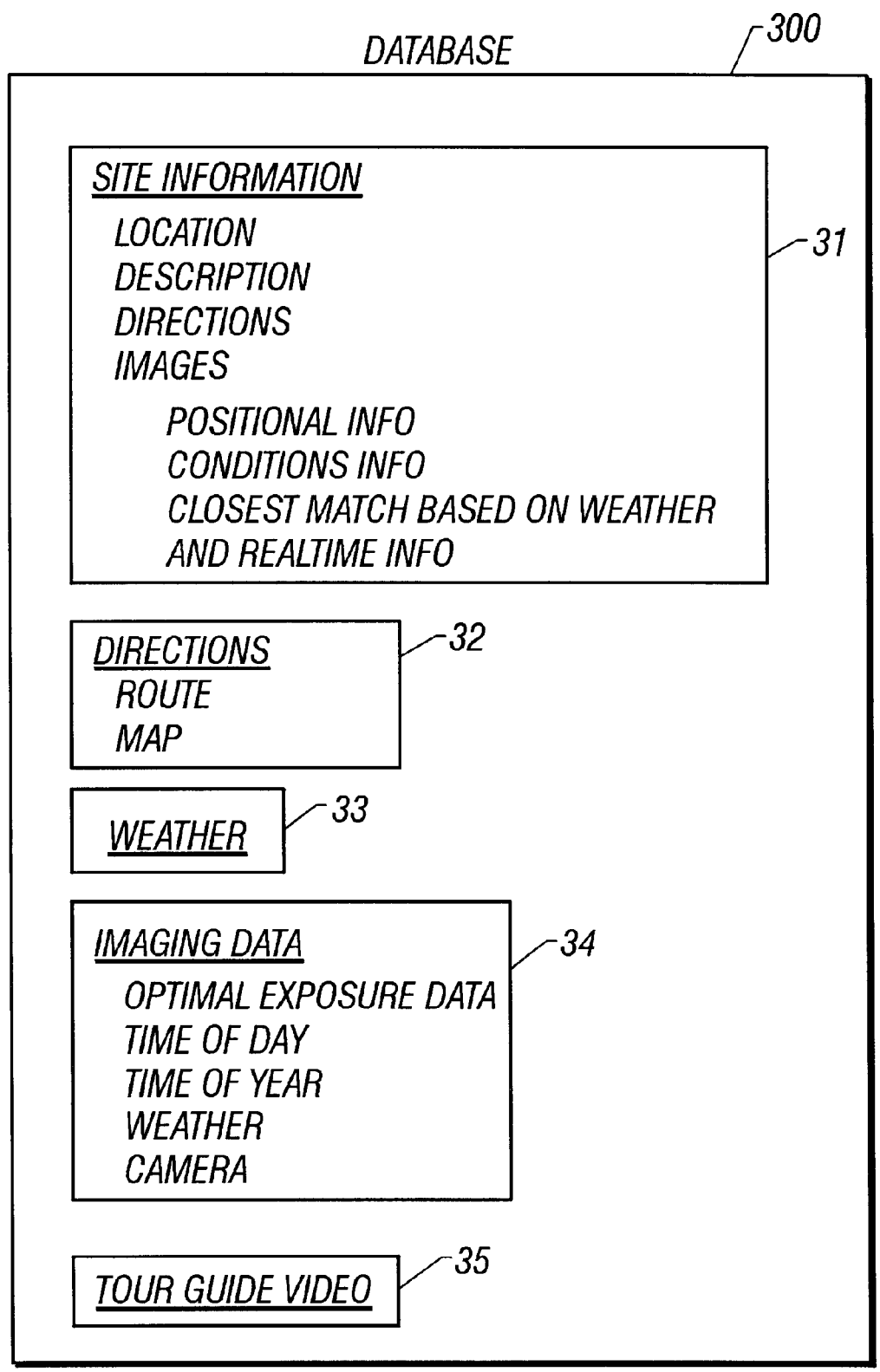
FIG. 3 is one example of a database according to the invention.

FIG. 3 shows an example of database 300 embodying presently preferred features of the invention. As shown in FIG. 3, database 300 includes database 31 of sites. Database of sites 31 includes site information such as locations and descriptions of scenic views and photo-spots. In a presently preferred embodiment, the database and positioning information serve to guide a user to sites and photo-spots by providing directions to the site or a map route. The database of sites preferably includes photographs or images of scenic views and photo-spots to allow a user to preview the site and decide if a visit to the site is worthwhile. More preferably, the database includes positioning information and other conditions information for the images it provides the user. The database also includes imaging data associated with each of the sites. "Imaging data" refers to information which optimizes capturing the view or site with an imaging device, such as a camera or other optical system configured to project an image of a subject onto a light sensitive media. For example, imaging data for a site includes exposure data for capturing the site on film (e.g., shutter speed, aperture, focal length, filter information, designation, etc.)

Database 300 may also provide imaging data 34 related to time-of-day. For example, imaging data for a site may include suggestions for the best time of day or year to capture or view particular sites, and may provide exposure data for capturing views at particular times of day or year.

Database 300 also preferably includes weather conditions 33 and related information about sites. This information may be used to allow the system to suggest exposure data for capturing a view under particular conditions, or provide the user with other weather-related advisories about sites.

According to another feature of the invention, database 300 can include route or map information 32. Preferably, the system uses the mapping information to provide a user with a route or directions to a site of interest, or provides a user with a suggestion of sites in the vicinity and directions to the sites. In a presently preferred embodiment, the system uses positional information, time of day, day-of-year, site information, and map information to guide a user to a photo-spot.

In accordance with another aspect of the invention, the mapping information and site information are used to provide a user with tour-guide type of information 35. "Tour-guide type of information" refers to information beyond more locational information, such as historical, cultural, and operational information. For example, the system of the present invention could be used to allow a traveler to access information about buildings the traveler passes without the traveler having to enter the historical significance of the site and further provide relevant information about the hours of operation, tour times, facilities, etc. The system could even caution the user as to crowds and suggest best times to visit or alternative sites to visit.

In accordance with a related aspect of the invention, the system may have processor 24 (FIG. 2) configured to identify a sequence for visiting a plurality of sites, or a plurality of user selected sites or sites related based on a user's parameters, and provide the user with itinerary information. In a preferred embodiment, the system is capable of altering the itinerary based on real time information from the database. Even more preferably, the system allows the user to procure reservations, inquire about availability, or otherwise interact with the sites in the database. As will be appreciated by one of ordinary skill in the art, the system has a suitable visual and/or audio display, and/or command keys and/or other user-inputting interface, to allow the user to receive and transmit data. For example, a PLDS according to the aspect of the invention could be in the form of a hand-held stand alone positioning system, or be a unit disposed in the dashboard of a car. Accordingly, the invention should not be viewed as limited to the physical configuration of the system.

One presently preferred configuration is a unit built into a camera. Although a hand-held standalone PLDS could be adapted to interact with a camera by a plug-in or wireless communication means, a built-in unit is presently preferred.

Figure 4:
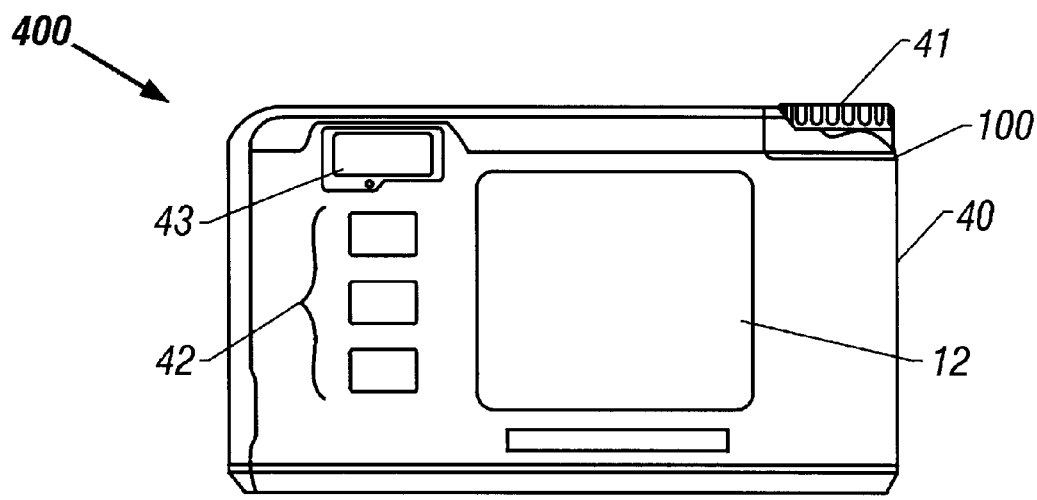
FIG. 4 is a plan view of one embodiment of the back of a photo-spot camera having a portable location database system built-in according to the invention.

FIG. 4 depicts the back of one embodiment of a photo-spot finding camera 400 with a built in PLDS according to the invention. As depicted in FIG. 4, camera 400, or other imaging device, is provided. Camera 400 may be any type of camera which has been modified to accommodate a PLDS according to the invention. E.g., camera 400 may be either a still, movie, digital or video camera. Accordingly, the invention should not be viewed as limited to the imaging device shown.

Camera 400 has housing 40 which contains antenna 41 of a built-in PLDS 100 exposed at a top area of camera 400. Although not shown, the camera houses microprocessor 24 and the other components of PLDS 100. Microprocessor 24 is in communication with database 300 or database 20. Alternatively, the database may be a diskette-type device which is inserted into the camera (not shown).

According to one embodiment of the invention, display 12 of PLDS 100 comprises an interactive LCD panel disposed on the back of camera 400 so as to be visible to a user while focusing on a target. Also disposed on the back of camera 400 are command keys 42 which allow a user to interact with display 12. Command keys 42 of FIG. 4 operate similarly to command keys 14 of FIG. 1. For example, commend keys 42 could allow a user to scroll through and select items from pick-lists displayed on the panel.

According to the embodiment, the type of information provided by database 300 (or 20) to display 12 includes information to aid a user in selecting a nearby site for visiting, and navigational information for guiding the user to a preferred photo-spot for capturing a preferred view of the site. For example, according to one embodiment, using command keys 42, the user is able to scroll through a list of nearby sites on display 12 and select a site to preview. The preview includes photographs of the site which have been added to the database by previous users or by this user at a previous time, to allow the user to determine if the site is worth visiting are to allow the user to see if this scene is different from his/her last picture. If the user keys in a desire to visit the site, navigational information to the site is provided. In addition, the system preferably provides the user with navigational information to the area where the selected previous photograph was taken. More preferably, the system provides the user with a map depicting the locations of each of the photographs of the site in the database to aid the user in determining whether to, and where to, photograph the site.

In a preferred embodiment, the information in database 300 (or 20) which may be accessed by the user includes imaging data for capturing a view of the site. Imaging data preferably includes recommendations for camera settings and parameters for capturing the view; and more preferably, includes recommendations that take into account weather and realtime information. In a preferred embodiment, the system displays to the user a set of camera settings and parameters which are particularly suited to the camera being used by user. This setting may be manually or automatically made.

According to one advantageous feature of the invention, any information, such as imaging data, may also be projected to the user when the user views the site through viewfinder 43 of camera 400.

In accordance with another aspect of the invention, camera 400 may be adapted to provide locational information and/or imaging data on the photographs taken by the camera 400. As will be appreciated by one of ordinary skill in the art, this information may be of use to the user for her own purposes, of use to future visitors to the photographed site in search of a photo-spot, or of use to other persons or parties desiring locational or imaging information about the photograph.

In a related aspect of the invention, the locational information (and/or the imaging information) associated with a picture is capable of being put into a local or remote database 300 (or 20) for use by other users of the database. As will be appreciated by one of ordinary skill in the art, the locational information and/or imaging data may be of particular interest to users of the present invention. For example, the locational information of the area from which the photograph was taken may aid users in determining the most appropriate photospot for capturing an image of the site. Further, access to a display of all the various areas from which the site has been photographed may aid the user in deciding if the site is worth capturing (i.e. - based on the number of photos taken) or in finding the area where most prior visitors chose to position themselves for capturing the site. Communications with remote databases may be established using conventional wireless connectivity such as cellular telephone or wireless Internet connection.

In addition, the locational information may be used in conjunction with time data and/or weather information in aiding users in finding the most appropriate photo-spot for the site at any given moment based on time of day, time of year, present weather conditions, and like information associated with the images of the site. Also, such information associated with images stored in the database may also allow users to preview what the view of the site is likely to entail and decide whether or not the site is worth visiting and/or capturing from a photo-spot.

In accordance with another advantageous feature of the invention, the system may provide imaging data to the user. Preferably, the imaging information provided will take into account locational, realtime and/or weather information in advising a user of the particular parameters best suited for capturing the site at a particular time. More preferably, the imaging data will take into account the particular type of camera being used in suggesting optimal parameters. Alternatively, the camera may take output that is not model specific and use the information as the particular camera model sees fit.

As will be appreciated by one of ordinary skill in the art, the information in database 300 (or 20) may come from a variety of sources. Likewise, it will be appreciated that information being accessed by processor 24 may come from a number of different databases. For example, photo-spot finding data may come from a database prepared by local Chambers of Commerce (or tourism boards) to encourage tourism to the area (likewise, such municipal organizations may be a prime source of tour-guide type information for use in the present invention); public databases, such as public web sites, which allow images and/or associated data to be uploaded for access by others; privately-run databases, such as a web site run by Popular Photography, which polices the input of information into the database but allows user access to the stored data; or any other like source of remote databases available on-line, commercially available databases provided on appropriate storage media (such as diskette), or database information downloadable to a local memory device. Accordingly, the present invention should not be viewed as limited by the source of information, the format of the information, or the exact content of the information.

Given the foregoing, variations and modifications to the invention should now be apparent to a person having ordinary skill in the art. These variations and modifications are intended to fall within the scope and spirit of the invention as defined by the following claims.

One such example would be the substitution of an audio set of directions (or an audio "picture") for the video display.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A portable camera for identifying sites of interest to a portable display and capturing an image of said site of interest, said camera comprising:
    a processor configured to identify a present location of said display;
    a database of sites connected to said processor wherein said database includes time relevant information for each of said sites;
    said display is configured to receive from said processor a visual display of nearby sites of said present location and time information; and
    an image capturing device configured to capture an image.

2. The camera of claim 1 wherein said processor includes Global Positioning System.

3. The camera of claim 1 wherein said database is remote from said processor, said processor including a wireless interface to said remote database.

4. The camera of claim 1 wherein said database of sites includes images of scenic views of at least some of said sites.

5. The camera of claim 4 wherein said database includes imaging data associated with each of said sites.

6. The camera of claim 5 wherein said imaging data includes exposure data.

7. The camera of claim 5 wherein said imaging data is based on time information.

8. The camera of claim 1 wherein said database includes weather condition related information about said sites.

9. The camera of claim 1 wherein said processor includes access to current and predicted weather conditions for an area associated with an identified present location of said display.

10. The camera of claim 1 wherein said camera is self contained with said display.

11. The camera of claim 1 wherein said database includes route information to each of said sites from an identified present location, such that said display may receive from said processor a display showing suggested route from the present location to at least one of said sites.

12. The camera of claim 1 wherein said processor is further configured to identify a sequence for visiting a plurality of selected ones of said sites, and to provide said identified sequence to said display.

13. The camera of claim 1 wherein said database includes tour-guide type information about said sites for communication to a user associated with said display.

14. A location smart imaging device comprising:
    an optical system configured to project an image of a subject onto a light sensitive media;
    a processor associated with said optical system and configured to identify a present location of said optical system and a present time;
    a database of sites, said database including the location of scenic views and images of scenic views; and
    a display disposed on said optical system, said display controllable by said processor for providing a visual display of the location of scenic views or images of scenic views in response to identifying one of said present locations and said time information.

15. The imaging device of claim 14 wherein said database includes imaging data associated with each of said sites.

16. The imaging device of claim 15 wherein said optical system includes a camera.

17. The method of touring a particular venue and recording images of said venue, said method comprising the steps of:
    allowing a portable device to access a central positioning system to obtain a geographical position of said device;
    based upon said obtained geographical position, accessing a database of information arranged according to geographical criteria;
    presenting to a user of said portable device geographically sensitive information pertaining to said obtained geographical position; and
    recording a received image onto a media.

18. The method of claim 17 wherein said database is remote from said device.

19. The method of claim 17 wherein said presented information are images pertinent to said obtained geographical position.

20. The method of claim 17 wherein said received images are scenes available to a lens of said portable device within a certain distance of said portable device, said information also including other data pertinent to each of said scenes.

* * * * *